United States Patent
Gulsen et al.

(10) Patent No.: US 10,901,960 B1
(45) Date of Patent: Jan. 26, 2021

(54) STATELESS ANALYTICS FOR COMMINGLED TENANT ISOLATED DATA

(71) Applicant: Workday, Inc., Pleasanton, CA (US)

(72) Inventors: Denis Gulsen, Redwood City, CA (US); Erol Guney, San Ramon, CA (US); Eric James Ranstrom, San Francisco, CA (US); Amir Ali Afghani, San Ramon, CA (US)

(73) Assignee: Workday, Inc., Pleasanton, CA (US)

( * ) Notice: Subject to any disclaimer, the term of this patent is extended or adjusted under 35 U.S.C. 154(b) by 176 days.

(21) Appl. No.: 15/693,927

(22) Filed: Sep. 1, 2017

(51) Int. Cl.
*G06F 16/20* (2019.01)
*G06F 16/21* (2019.01)
*G06F 21/60* (2013.01)

(52) U.S. Cl.
CPC ............. *G06F 16/21* (2019.01); *G06F 21/60* (2013.01)

(58) Field of Classification Search
CPC ................................. G06F 16/21; G06F 21/60
See application file for complete search history.

(56) References Cited

U.S. PATENT DOCUMENTS

| | | | |
|---|---|---|---|
| 7,890,592 B2 | 2/2011 | Setiawan | |
| 10,250,624 B2 | 4/2019 | Mixer | |
| 10,373,194 B2 | 8/2019 | Opie | |
| 2002/0178139 A1* | 11/2002 | Chen | G06F 16/283 |
| 2008/0077515 A1* | 3/2008 | Zoldi | G06Q 40/00 705/35 |
| 2009/0282045 A1* | 11/2009 | Hsieh | G06F 21/6218 |
| 2010/0161362 A1* | 6/2010 | Shapira | G06Q 10/00 705/7.11 |
| 2014/0075004 A1* | 3/2014 | Van Dusen | H04L 41/04 709/223 |
| 2014/0129662 A1* | 5/2014 | Sandy | H04L 12/1859 709/207 |
| 2014/0157370 A1* | 6/2014 | Plattner | G06F 21/6245 726/4 |
| 2016/0070758 A1* | 3/2016 | Thomson | G06F 21/6245 707/781 |
| 2016/0112208 A1* | 4/2016 | Williams | H04L 9/006 713/158 |
| 2016/0224760 A1* | 8/2016 | Petak | G16H 50/20 |
| 2017/0169800 A1* | 6/2017 | Greco | G06F 3/0482 |
| 2018/0121622 A1* | 5/2018 | Armstrong | G16H 50/20 |
| 2018/0157761 A1* | 6/2018 | Halstead | H04L 63/0428 |
| 2018/0285596 A1 | 10/2018 | Jones | |
| 2019/0058991 A1 | 2/2019 | Al-Kabra | |

* cited by examiner

*Primary Examiner* — Tarek Chbouki
(74) *Attorney, Agent, or Firm* — Van Pelt, Yi & James LLP (57) ABSTRACT

A system for an analytic database includes a commingling storage unit, an interface, and a processor. The interface is configured to receive an indication to build an analytic database. The processor is configured to transfer data to build the analytic database stored in the commingling storage unit, and build the analytic database using the data.

20 Claims, 11 Drawing Sheets

| Tenant Data | | | | |
|---|---|---|---|---|
| ID # | Name | Gender | Title | Salary |
| 961201338 | Jason King | M | Engineer I | 85000 |
| 020221304 | Anna Hettich | F | Manager | 90000 |
| 193045732 | Meredith Murphy | F | Engineer I | 85000 |
| 108960805 | Matt Steiger | M | Sr. Manager | 105000 |
| 937613833 | Christine Goldbard | F | Sales | 85000 |
| 806712881 | Carl Nikolov | M | Sales | 85000 |
| 167344647 | Josh Angela | M | Engineer II | 95000 |
| 638493704 | Stan Miltenberger | M | Manager | 90000 |
| 428342316 | Michelle Charrow | F | Engineer II | 95000 |
| 518982603 | Laura Muffington | F | Sr. Manager | 105000 |

STATELESS ANALYTICS FOR COMMINGLED TENANT ISOLATED DATA

BACKGROUND OF THE INVENTION

On a software as a service platform, tenant data is strictly segregated in order to maintain separation of data belonging to different tenants. Tenant data is stored on a set of data partitions securely separated by tenant (e.g., on different computers, on different hard drives, on different virtual machines, etc.) in order to prevent users from accessing data belonging to other tenants. In some situations, tenants wish to share data for comparison purposes or to get a more complete view of a situation (e.g., salary surveys or other industry benchmarks) and they provide a data set to a third party in exchange for access to the pooled set. However, sharing data with a third party makes it difficult for a tenant to enforce a custom security policy in the event the tenant does not want to share all the data requested by the third party or in the event the tenant wants to update its security settings (e.g., rescind permission to use its data). This makes it more likely the tenant will choose not to use the service at all.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for an analytic database comprises a commingling storage unit, an interface configured to receive an indication to build an analytic database, and a processor configured to retrieve data to build the analytic database stored in the commingling storage unit and build the analytic database using the data. In some embodiments, the system for an analytic database additionally comprises a memory coupled to the processor and configured to provide the processor with instructions.

A system for secure commingling of tenant isolated data comprises a set of tenant data storage units and a commingling storage unit. Tenant data for a tenant is stored for typical system use on a tenant data storage unit. A tenant has access to data stored on its associated tenant data storage unit but not to data stored on tenant data storage units associated with other tenants. A tenant is prompted to opt in to the secure data commingling system.

In the event the tenant opts in, data is filtered to remove data identified by the tenant as not to be shared with the secure data commingling system. The tenant is given a set of data options (e.g., data categories, data subcategories, etc.) that may be indicated as opt-in (e.g., shared) or opt-out (e.g., not to be shared) on the secure data commingling system. The filtered data is then transferred from the tenant data storage unit to a commingling storage unit. Data analyses can be run on data stored by the analytic database on the commingling storage unit in order to create reports.

Building the analytic database on the commingling storage unit is accomplished by copying the filtered data from each tenant according to the opt-in instructions. The database can be rebuilt from the tenant data storage units at any time. A set of trigger indicators is used to determine when to rebuild the database (e.g., when a tenant opts-in to or opts-out of the system, when data is added, changed, or deleted, when a tenant opts-in to or opts-out of a data category or data subcategory, etc.). When a trigger indicator is determined, an indication to rebuild the system is provided, and the system is rebuilt. Any change made by a tenant to its associated tenant data storage only affects data stored on the analytic database after the database is rebuilt.

Figure 1:
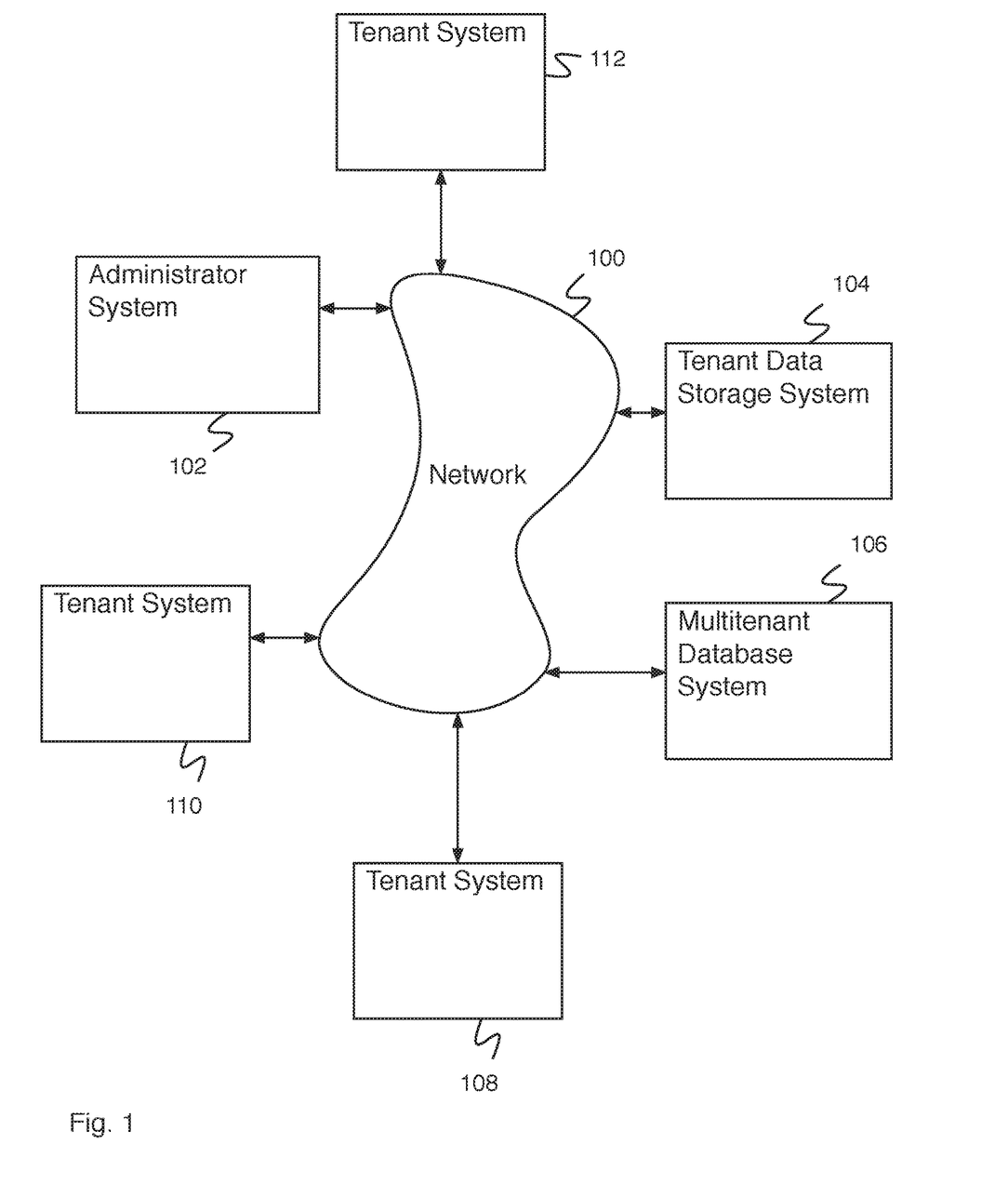
FIG. 1 is a block diagram illustrating an embodiment of a network system.

FIG. 1 is a block diagram illustrating an embodiment of a network system. In some embodiments, the network system of FIG. 1 comprises a system for stateless analytics for commingled tenant isolated data. In the example shown, tenant system 108, tenant system 110, and tenant system 112 store data associated with each of the different systems in separate areas of tenant data storage system 104. This separation ensures that a given tenant's data is secure. However, there are times when it is useful to have access to have access to a pool of many tenants' data in exchange for providing access to the tenant's own data. Data that is part of the multitenant pool of data is stored either in tenant data storage system 104 in a commingling area or in multitenant database system 106. Multitenant database system 106 enables access to the multitenant pool of data as part of a service (e.g., a benchmarking service that enables comparison of tenant data with a larger pool of data from other tenants). A tenant can opt in to sharing data in exchange for access to the data pool and opting in enables multitenant database system 106 to access a copy of relevant data associated with the opt in plan and appropriately stripped of identification information. Administrator system 102 is able to administrate different components of the system including multitenant database system 106.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, tenant system 108 and tenant system 110 communicate via network 100. Administrator system 102 comprises an administrator system for use by an administrator. Administrator system 102 comprises an administrator system for executing administrator commands, for configuring tenant data storage system 104 or multitenant database system 106, for querying tenant data storage system 104 or multitenant database system 106, etc. Tenant data storage system 104 comprises a storage system for storing tenant data (e.g., customer organization data). Tenant data storage system 104 comprises a plurality of tenant data storage units for storing tenant data isolated by tenant, and in some cases, a commingling storage unit for storing commingled tenant data. Multitenant database system 106 comprises a database system for providing tenant user access to data stored on either in a commingling storage unit of tenant data storage system 104 or in multitenant database system 106 (e.g., access to add data, view data, modify data, delete data, access reports, execute business processes, etc.). Tenant system 108 comprises a tenant system for use by a tenant user. A tenant user uses tenant system 108 to interact with multitenant database system 106, for example to store database data, to request database data, to request reporting based on database data, etc. In some embodiments, the network system of FIG. 1 comprises a plurality of tenant systems associated with one or more tenants.

Tenant data storage system 104 comprises a tenant data storage system for storing data in a database for a set of tenants. Tenant data storage system 104 comprises a set of distinct tenanted storage systems (for example—separate hard drives, separate virtual machines, etc.) for storing tenant data in such a way that tenants cannot access each other's data. Tenant data storage system 104 additionally comprises a secure data commingling system for managing data transfer from the tenanted storage systems to the commingling storage and for executing data analyses and reporting on the commingling storage unit. Multitenant database system 106 comprises a system for performing database actions (e.g., storing data, modifying data, querying data, performing reports, etc.) on tenant data stored in a commingling storage area of either tenant data storage system 104 or multitenant database system 106. A secure data commingling system includes interfaces for transmitting and receiving tenant data (e.g., from one or more tenant data storage units to a commingling storage area). The secure data commingling system additionally comprises a processor for determining one or more instances of data indicated not to be transferred included in the tenant data, and for indicating (e.g., to the interface) to transfer the tenant data to be stored in a commingling storage unit without transferring the one or more instances of data indicated not to be transferred.

Figure 3:
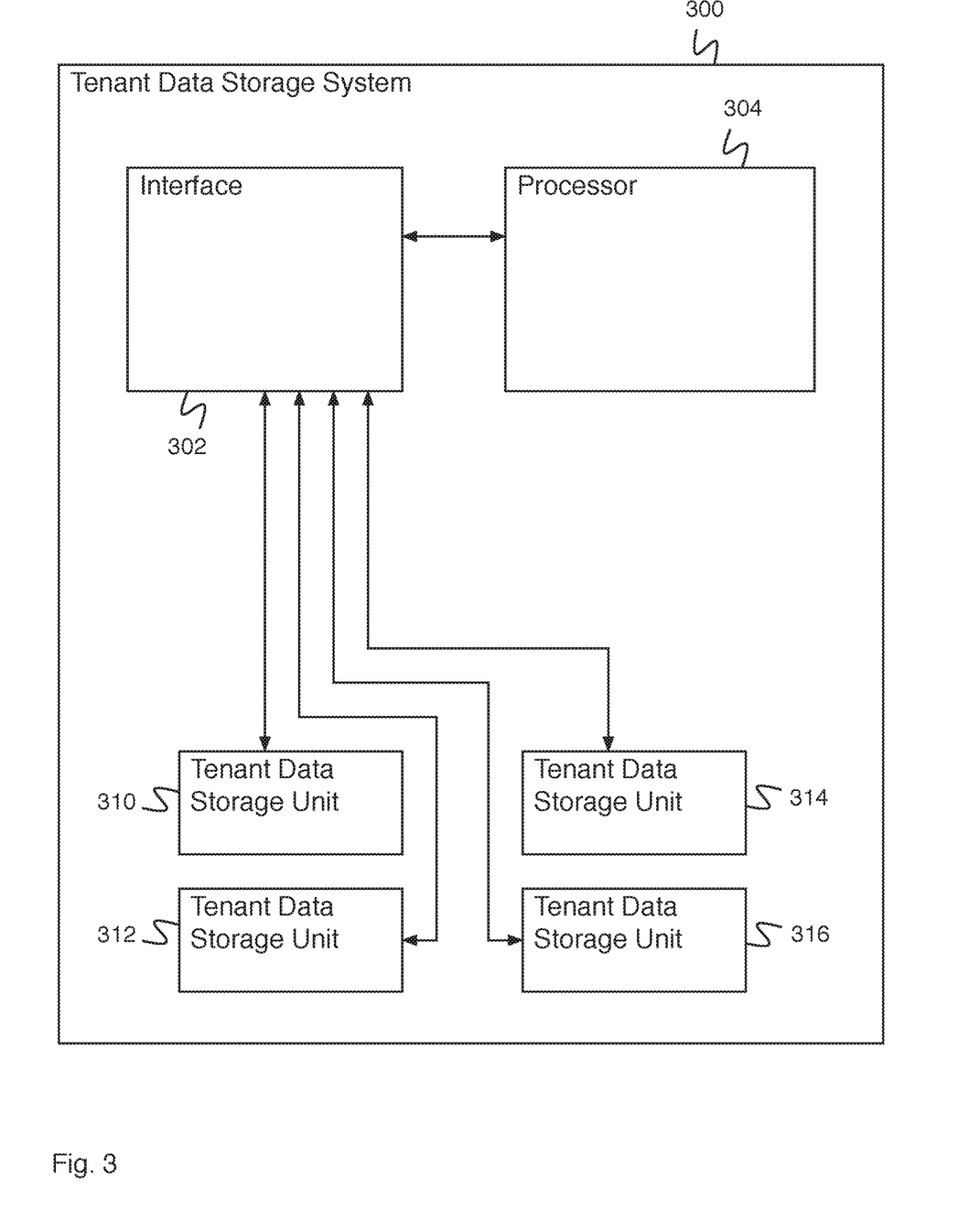
FIG. 3 is a block diagram illustrating an embodiment of a tenant data storage system.
Figure 4:
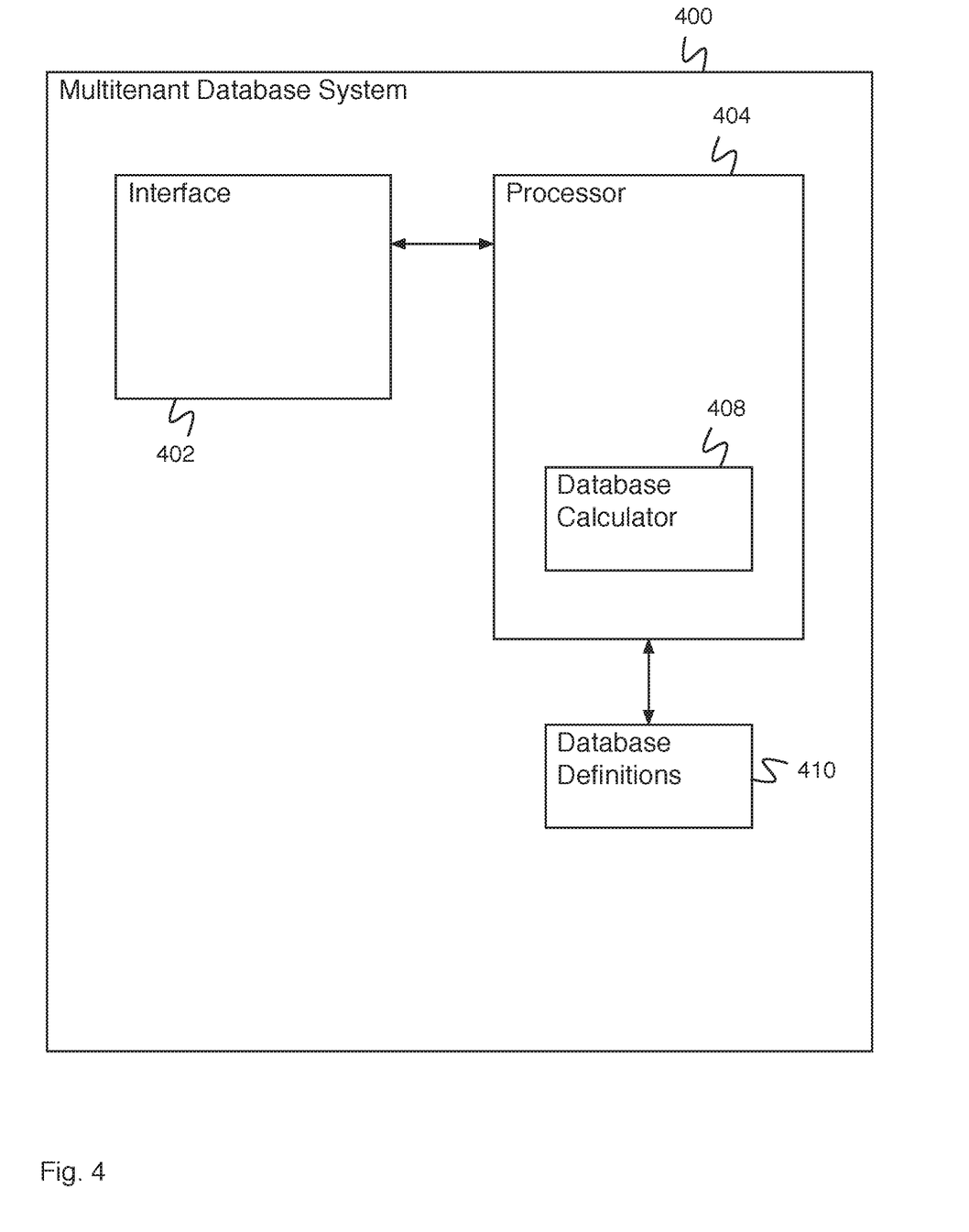
FIG. 4 is a block diagram illustrating an embodiment of a multitenant database system.
Figure 5:
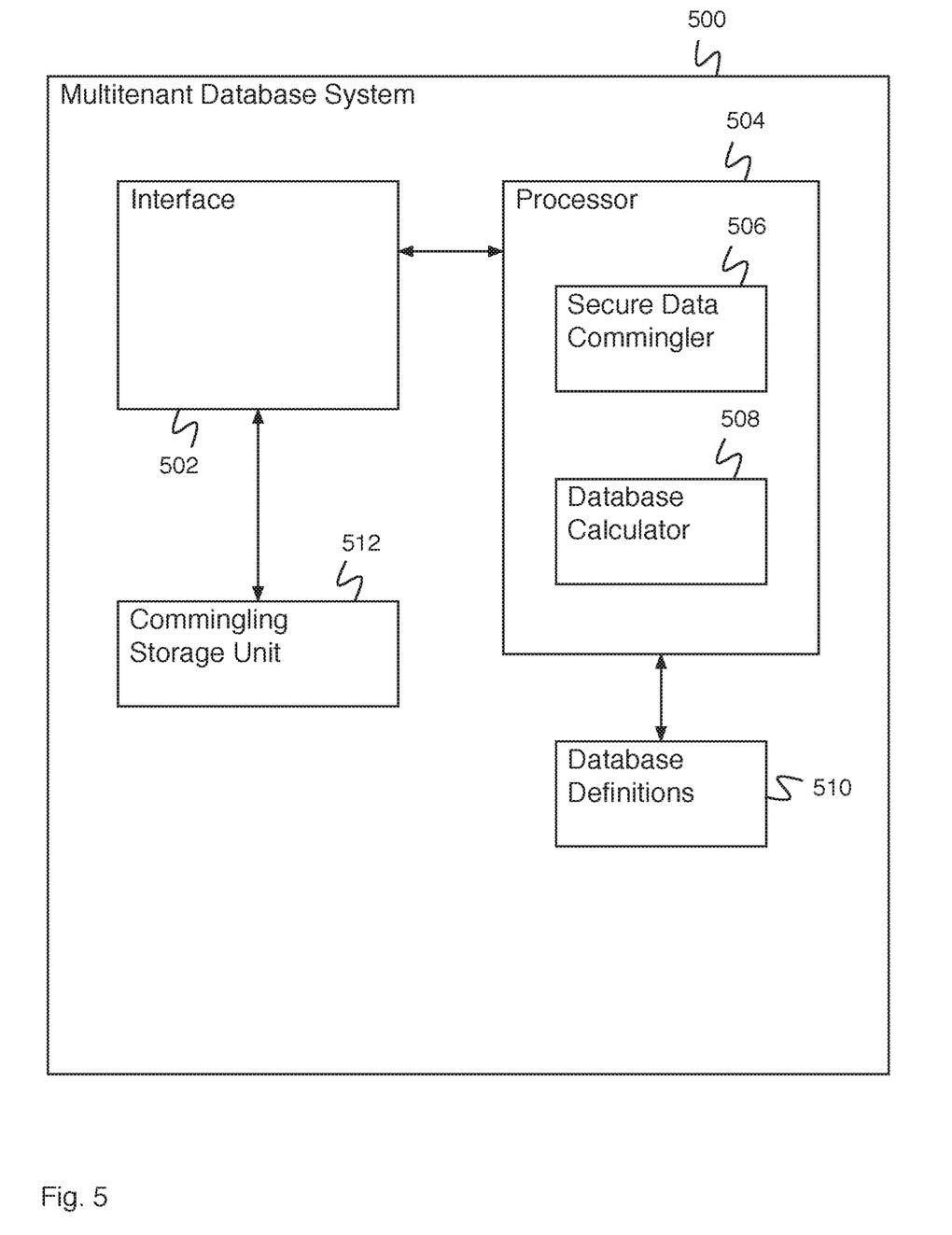
FIG. 5 is a block diagram illustrating an embodiment of a multitenant database system.

In the following FIGS. 2, 3, 4, and 5, variations of the location of the subsystems of the secure data commingler and the commingling storage unit are shown. Specifically, the location of the secure data commingler and the commingling storage unit is either in the tenant data storage unit (a combination of FIG. 2 and FIG. 5 are used as the implementations for the corresponding units in FIG. 1), the multitenant database system (a combination of FIG. 3 and FIG. 4 are used as the implementations for the corresponding units in FIG. 1), or both the tenant data storage unit and the multitenant database system (a combination of FIG. 2 and FIG. 4 are used as the implementations for the corresponding units in FIG. 1).

Figure 2:
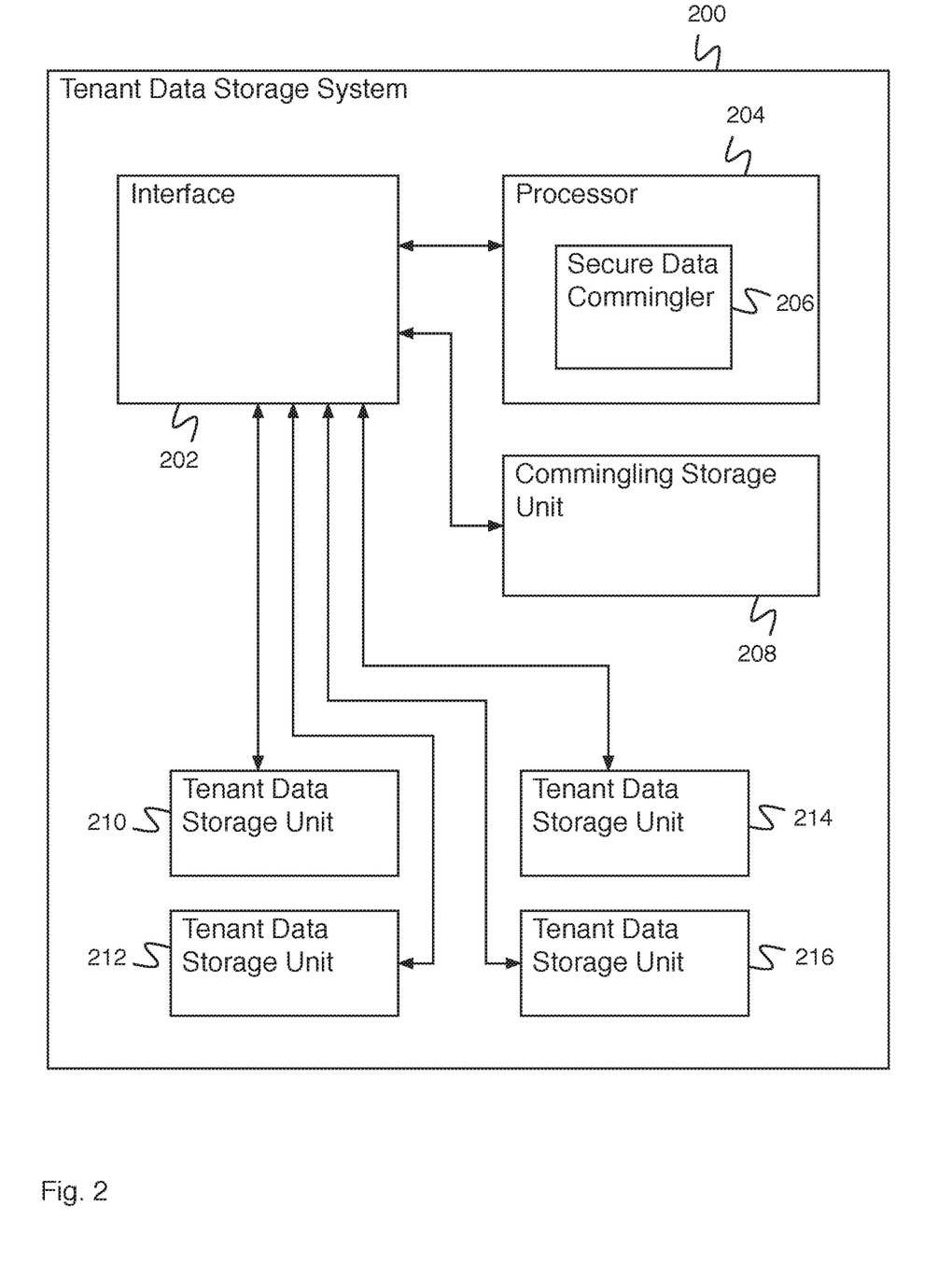
FIG. 2 is a block diagram illustrating an embodiment of a tenant data storage system.

FIG. 2 is a block diagram illustrating an embodiment of a tenant data storage system. In some embodiments, tenant data storage system 200 comprises tenant data storage system 104 of FIG. 1. In the example shown, tenant data storage system 200 is used to store different tenants' data in separate storage areas in tenant data storage unit 210, tenant data storage unit 212, tenant data storage unit 214, and tenant data storage unit 216. Each tenant has associated with it a separate storage area—for example, each tenant data storage unit could be entirely associated with a different single tenant. The plurality of tenant data storage units serves to store data associated with different tenants. Tenant data storage system 200 comprises any appropriate number of tenant data storage units. Tenant data storage system 200 additionally comprises commingling storage unit 208 for commingling a portion of tenant data. Tenant data storage system 200 additionally comprises secure data commingler 206. Tenant data storage system 200 comprises processor 204 and interface 202. Interface 202 comprises an interface for receiving requests to provide or store tenant data (e.g., to and from tenant data storage unit 210, from tenant data storage unit 212, from tenant data storage unit 214, or from tenant data storage unit 216) and for providing and receiving tenant data to be commingled in commingling storage unit 208.

Secure data commingler 206 of processor 204 is configured to build an analytic database stored in commingling storage unit 208 using commingled data stored on commingling storage unit 208. Secure data commingler 206 is able to delete and/or rebuild the analytic database from the commingled data in response to an indication. Secure data commingler 206 of processor 204 determines one or more instances of data indicated not to be transferred included in the tenant data and indicates to prevent the one or more instances of data indicated not to be transferred included in the tenant data from being transferred from a tenant data storage unit to commingling storage unit 208. Processor 204 indicates to interface 202 to transfer tenant data to be stored in commingling storage unit 208 without transferring the one or more instances of data indicated not to be transferred.

Interface 202 additionally comprises an interface for receiving an indication to transfer data to commingling storage unit 208, receiving a request for report data based on data stored in commingling storage unit 208, receiving an indication of a new tenant, etc. Data stored on commingling storage unit 212 is used for a service (e.g., determination of statistics, reporting, benchmarking, etc.).

In various embodiments, tenant data is transferred upon request (e.g., a tenant request, an administrator request, etc.) or tenant data is transferred automatically (e.g., according to a predetermined schedule, when specific conditions are met, etc.). In some embodiments, secure data commingler 206 comprises a part of a system for determining whether a tenant is identifiable based on the report data or determining a set of tenants associated with the tenant data stored on commingling storage unit 208. In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

FIG. 3 is a block diagram illustrating an embodiment of a tenant data storage system. In some embodiments, tenant data storage system 300 comprises tenant data storage system 104 of FIG. 1. In the example shown, tenant data storage system 300 is used to store different tenants' data in separate storage areas in tenant data storage unit 310, tenant data storage unit 312, tenant data storage unit 314, and tenant data storage unit 316. Each tenant has associated with it a separate storage area—for example, each tenant data storage unit could be entirely associated with a different single tenant. The plurality of tenant data storage units serves to store data associated with different tenants. Tenant data storage system 300 comprises any appropriate number of tenant data storage units. Tenant data storage system 300 additionally is able to transfer tenant stored data to a commingling storage unit (not shown in FIG. 3) for commingling a portion of tenant data. Tenant data storage system 300 comprises processor 304 and interface 302. Interface 302 comprises an interface for receiving requests to provide or store tenant data (e.g., to and from tenant data storage unit 310, from tenant data storage unit 312, from tenant data storage unit 314, or from tenant data storage unit 316) and for providing and receiving tenant data to be commingled in a commingling storage unit.

Secure data commingler of another system is configured to build an analytic database stored in a commingling storage unit. The secure data commingler is able to delete and/or rebuild the analytic database in response to an indication. The secure data commingler determines one or more instances of data indicated not to be transferred included in the tenant data and indicates to prevent the one or more instances of data indicated not to be transferred included in the tenant data from being transferred from a tenant data storage unit to the commingling storage unit to be a part of the analytic database. Processor 304 indicates to interface 302 to transfer tenant data to be stored in the commingling storage unit without transferring the one or more instances of data indicated not to be transferred.

In various embodiments, tenant data is transferred upon request (e.g., a tenant request, an administrator request, etc.) or tenant data is transferred automatically (e.g., according to a predetermined schedule, when specific conditions are met, etc.). In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

FIG. 4 is a block diagram illustrating an embodiment of a multitenant database system. In some embodiments, multitenant database system 400 is used to implement multitenant database system 106 of FIG. 1 with the tenant data storage system of FIG. 2. In the example shown, multitenant database system 400 receives a request, via interface 402, from a user for a service that uses multitenanted data. Database calculator 408 of processor 404 using database definitions 410 determines a report using data stored in a commingling storage unit and provides the report to the user. The data in commingling storage unit is acquired using a secure data commingler from a number of tenant data storage units. A tenant can opt into sharing data for use by a service (e.g., a benchmarking service) and the data is transferred to a commingling storage unit. The data is transferred in some cases automatically when the data is updated so that the data stored in the commingling storage unit is always up to date.

The data is also inspected using a processor associated with the transfer of data (e.g., a processor of tenant data storage system) to determine whether there are any instances of data indicated not to be transferred that should not be part of the data stored in the commingling storage unit.

FIG. 5 is a block diagram illustrating an embodiment of a multitenant database system. In some embodiments, multitenant database system 500 is used to implement multitenant database system 106 of FIG. 1 with the tenant data storage system of FIG. 3. In the example shown, multitenant database system 500 receives a request, via interface 502, from a user for a service that uses multitenanted data. Database calculator 508 of processor 504 using database definitions 510 determines a report using data stored in a commingling storage unit (e.g., commingling storage unit 512) and provides the report to the user. The data in commingling storage unit 512 is acquired using secure data commingler 506 from a number of tenant data storage units. A tenant can opt into sharing data for use by a service (e.g., a benchmarking service) and the data is transferred to a commingling storage unit (e.g., commingling storage unit 512). The data is transferred in some cases automatically when the data is updated so that the data stored in the commingling storage unit is always up to date.

The data is also inspected using a processor associated with the transfer of data (e.g., a processor of tenant data storage system) to determine whether there are any instances of data indicated not to be transferred that should not be part of the data stored in the commingling storage unit.

In some embodiments, the commingling storage unit and the secure data commingler is split between two systems and in that case multitenant database system 500 of FIG. 5 can be used in conjunction with tenant data storage system of FIG. 2. In some cases, each of the two commingling storage units are operated by the associated collocated secure data commingler. Data for a report is separately retrieved from each commingling storage unit.

Figure 6:
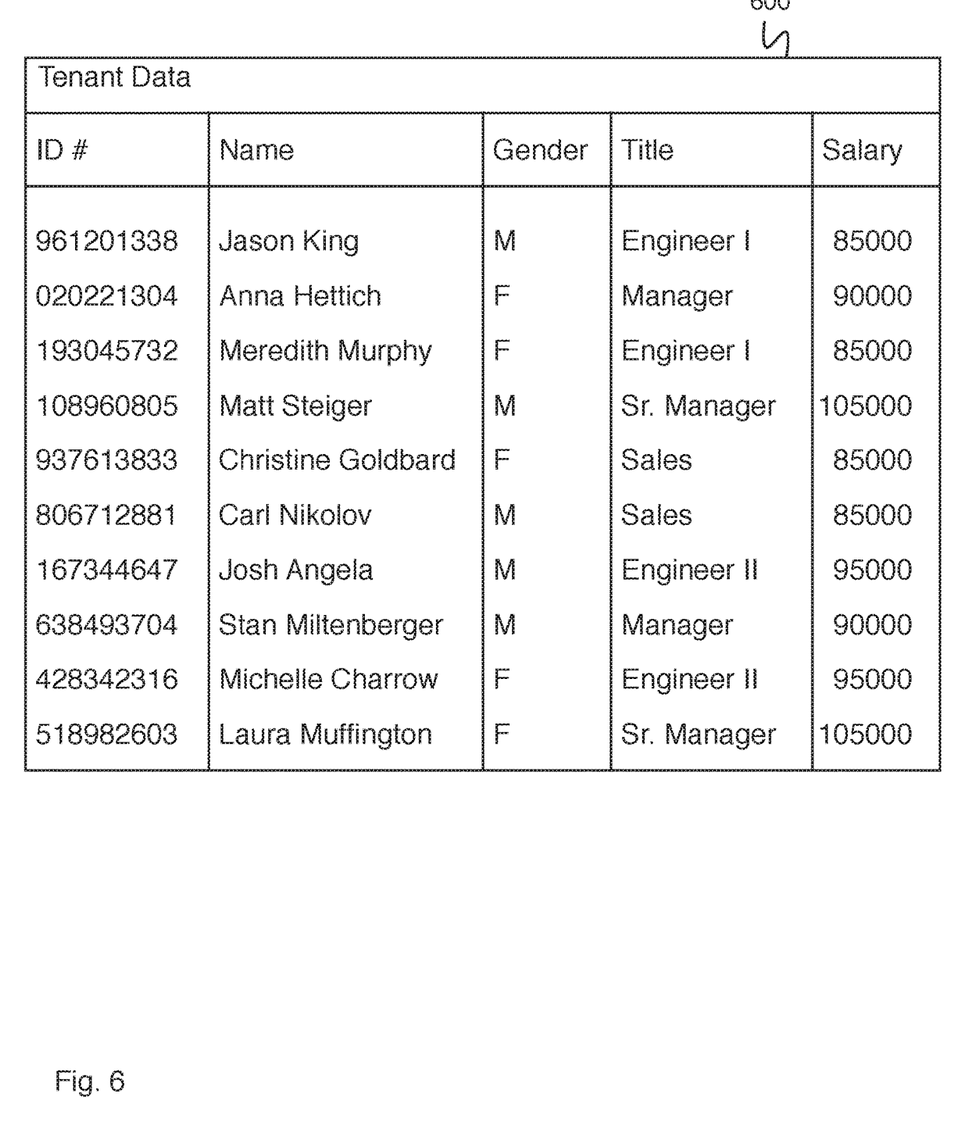
FIG. 6 is a diagram illustrating an embodiment of tenant data.

FIG. 6 is a diagram illustrating an embodiment of tenant data. In some embodiments, tenant data 600 comprises tenant data stored on a tenant data storage unit (e.g., tenant data storage unit 210 of FIG. 2 or tenant data storage unit 310 of FIG. 3). In the example shown, tenant data 600 comprises data describing a set of employees (e.g., including data for identification number, name, gender, title, and salary). In some embodiments, some of the data comprises data indicated not to be transferred (e.g., data of a category indicated by the tenant not to be transferred to the secure data commingling system). In some embodiments, in the event tenant data is transferred from a tenant data storage unit to a commingling storage unit, data indicated not to be transferred is not transferred. In some embodiments, the tenant associated with tenant data 600 provides an indication to not transfer certain data categories from a tenant data storage unit to a commingling storage unit (e.g., title, salary, etc.).

Figure 7:
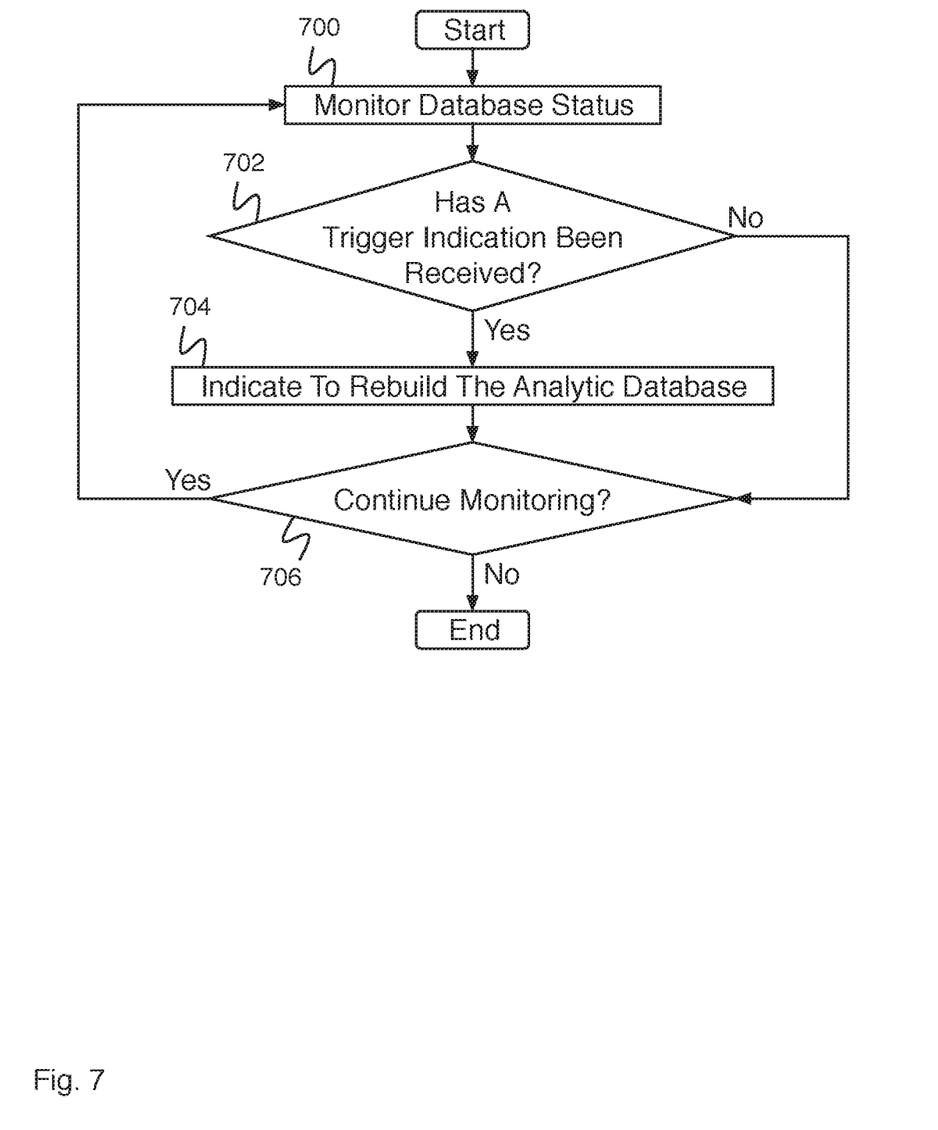
FIG. 7 is a flow diagram illustrating an embodiment of a process for monitoring a database.

FIG. 7 is a flow diagram illustrating an embodiment of a process for monitoring a database. In some embodiments, the process of FIG. 7 is executed by secure data commingler 206 of FIG. 2 or secure data commingler 506 of FIG. 5 for monitoring a database of tenant data (e.g., a set of tenant data storage units). In the example shown, in 700, a database status is monitored. In 702, it is determined whether a trigger indication has been received. In various embodiments, a trigger indication comprises a key data change in tenant data storage unit event, a new data made available event, a new data made unavailable event, an opt-in indication event, an opt-out indication event, or any other appropriate trigger indication event. In the event it is determined that a trigger indication has not been received, control passes to 706. In the event it is determined that a trigger indication has been received, control passes to 704. In 704, it is indicated to rebuild the analytic database. In 706, it is determined whether to continue monitoring. In the event it is determined to continue monitoring, control passes to 700. In the event it is determined not to continue monitoring, the process ends.

The automatic triggering of a rebuilding of an analytic database enables updating of commingled data on a continuous basis. This enables the tenant owner of the data that is being shared to continue to control whether its data is to be shared on an on-going basis. In addition, the data available for the analytics is always up to date as the database is rebuilt or updated on a predetermined bases (e.g., periodically, on change of data, on change of opt-in/opt-out status, etc.)

Figure 8:
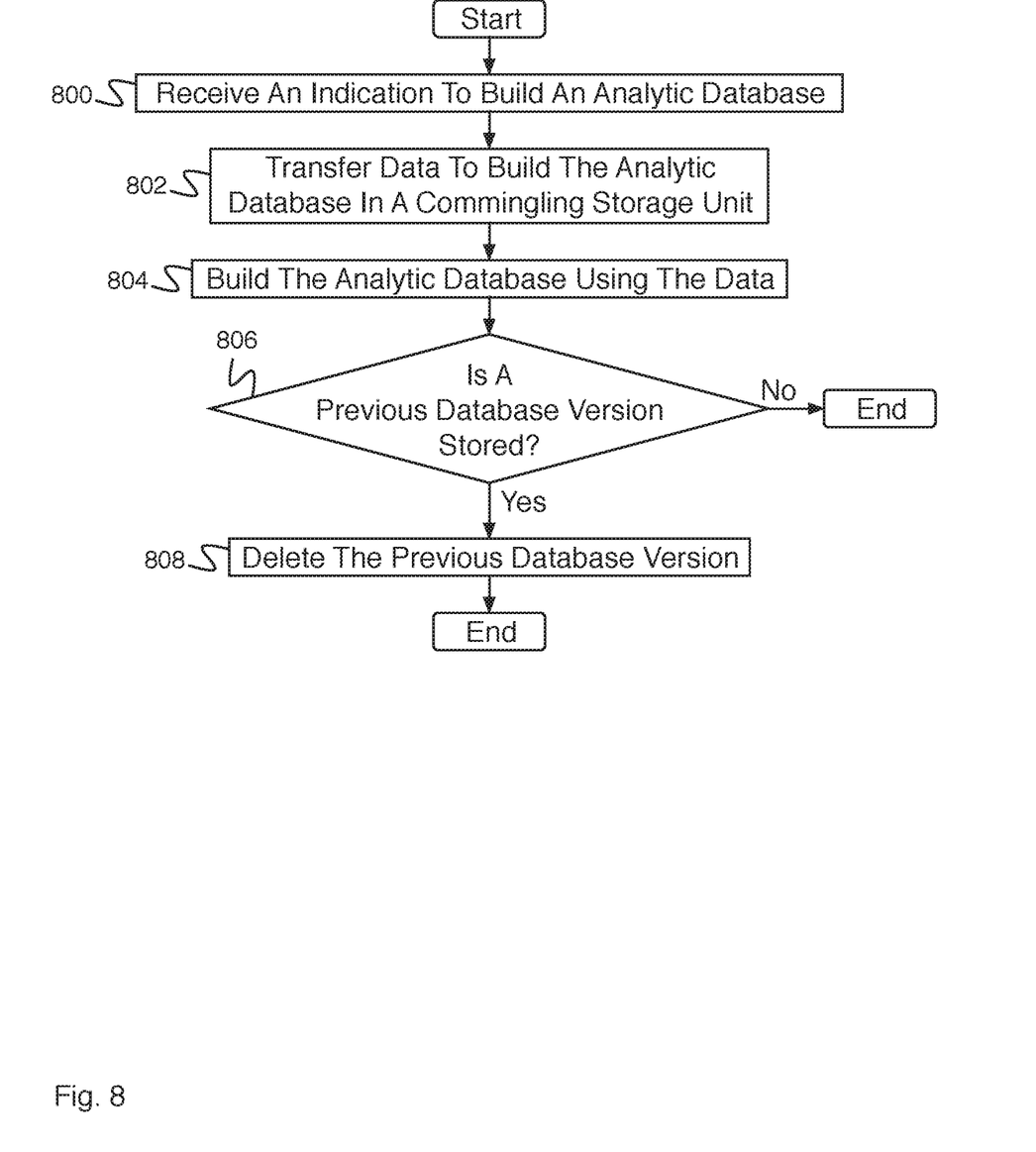
FIG. 8 is a flow diagram illustrating an embodiment of a process for an analytic database.

FIG. 8 is a flow diagram illustrating an embodiment of a process for an analytic database. In some embodiments, the process of FIG. 8 is executed by secure data commingler 206 of FIG. 2 or secure data commingler 506 of FIG. 5. In the example shown, in 800, an indication to build an analytic database is received. In 802, data is transferred to build the analytic database in a commingling storage unit. For example, data stored in tenant data storage units is selectively transferred to the analytic database. In 804, the analytic database is built using the data. In 806, it is determined whether a previous database version is stored. In the event it is determined that a previous database version is not stored, the process ends. In the event it is determined that a previous database version is stored, control passes to 808. In 808, the previous database version is deleted.

Figure 9:
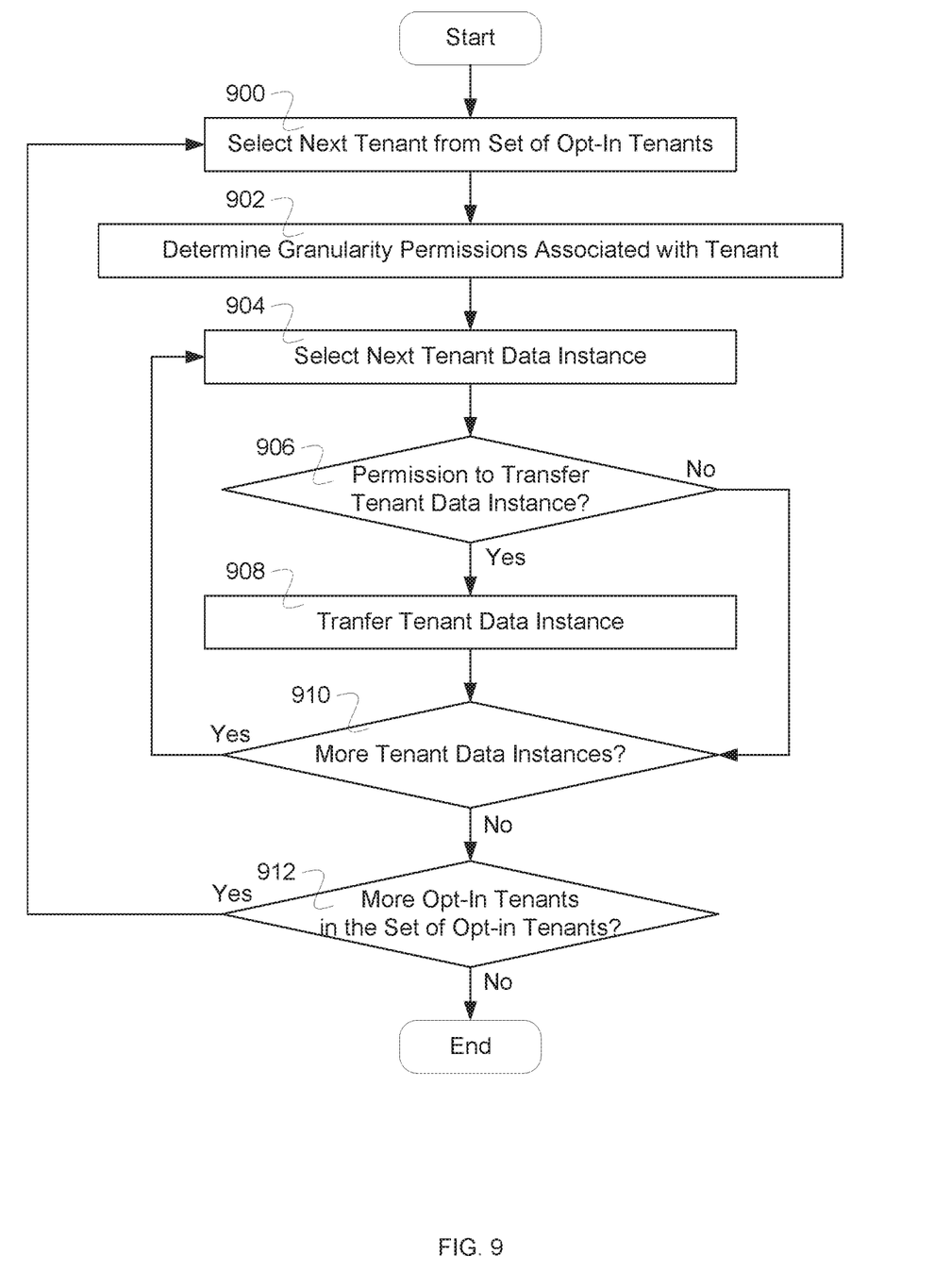
FIG. 9 is a flow diagram illustrating an embodiment of a process for transferring data.

FIG. 9 is a flow diagram illustrating an embodiment of a process for transferring data. In some embodiments, the process of FIG. 9 implements 802 of FIG. 8. In the example shown, in 900, the next tenant is selected from a set of opt-in tenants (e.g., a set of tenants that have provided an opt-in indication to opt in to an analytics system). In some embodiments, the next tenant comprises the first tenant. In some embodiments, a tenant is able to self-initiate the transmission process of steps 902-910. In 902, granularity permissions associated with the tenant are determined. For example, granularity permissions comprising permissions at the instance level, at a group of instance level, or any appropriate granularity level of instances. For example, granular permissions may need to be set up to be in compliance with policies, rules, or laws. As examples, companies may not be allowed to share data about all workers or just certain populations of workers by statute; a work council may prohibit sharing of worker salary information—in such a case individual level information could not be sent to the commingled storage, but aggregate level information might be valid to share. Alternatively a workers council for a particular country might forbid sharing gender information about workers both at an individual and an aggregate level—in such cases these populations of workers would need to be excluded from a tenant's communication both to and from the commingled store entirely. In some embodiments, granularity permissions indicate one or more instances of tenant indicated data to not be transferred. In some embodiments, granularity permissions associated with the tenant are stored. In various embodiments, tenant indicated data to not be transferred comprises data categories (e.g., location, time period, organization unit level, etc.) data sub-categories, or any other appropriate tenant indicated data. In 904 a next tenant data instance is selected. In some embodiments, the next tenant data instance comprises the first tenant data instance. In 906, it is determined whether there is permission to transfer the tenant data instance. For example, determining whether to transfer the data comprises determining whether the data is indicated to be transferred according to the granularity permissions associated with the tenant. In the event that there is not permission to transfer the tenant data instance, control passes to 910. In the event that there is permission to transfer the tenant data instance, in 908 the tenant data instance is transferred. In some embodiments, tenant data is received by a system for an analytic database (e.g., a secure data commingling system) from a tenant data storage system. In some embodiments, tenant data is accessed by a system for an analytic database on a tenant data storage system. In some embodiments, tenant data is selected to be received according to analytics-based granularity (e.g., only data used for analytics is received). In 910, it is determined whether there are more tenant data instances (e.g., of the set of tenant data instances). In the event it is determined that there are more tenant data instances, control passes to 904. In the event it is determined that there are not more tenant data instances, control passes to 912. In 912, it is determined whether there are more opt-in tenants of the set of opt-in tenants. In the event it is determined that there are more opt-in tenants, control passes to 900. In the event it is determined that there are not more opt-in tenants, the process ends.

Figure 10:
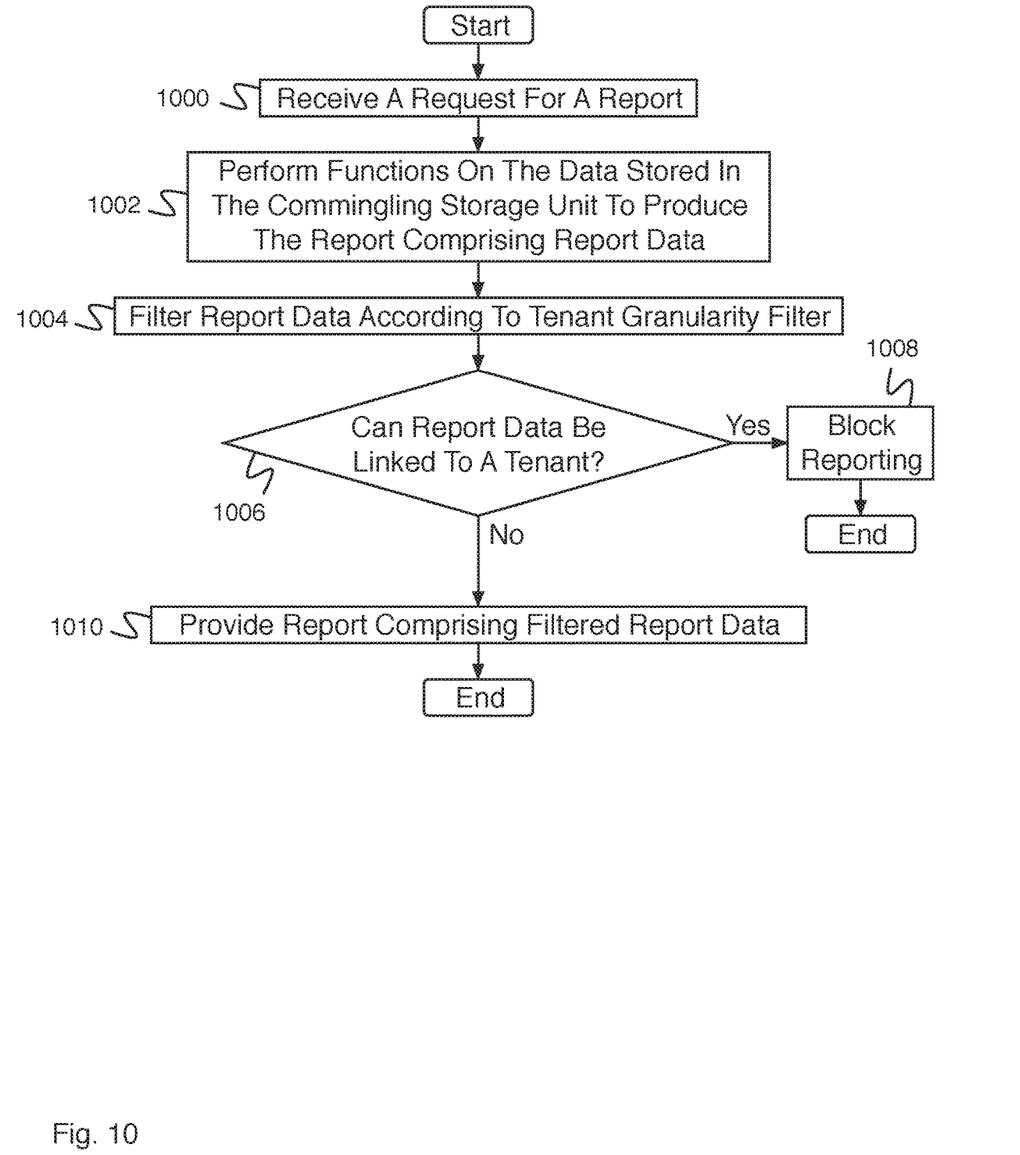
FIG. 10 is a flow diagram illustrating an embodiment of a process for reporting.

FIG. 10 is a flow diagram illustrating an embodiment of a process for reporting. In some embodiments, the process of FIG. 10 is executed by secure data commingler 206 of FIG. 2 or secure data commingler 506 of FIG. 5. In the example shown, in 1000, a request is received for a report (e.g., from a tenant). A request to perform a report comprises report information, for example report data sources, report functions, report output parameters, a reporting time period, etc. In 1002, functions are performed on the data stored in the commingling storage unit (e.g., on an analytic database) to produce the report comprising report data. In some embodiments, data stored in the commingling storage unit comprises historical transaction data (e.g., historical data associated with a transaction date and time). In various embodiments, performing functions on the data comprises performing operations, calculations, searches, or any other appropriate functions. In some embodiments, performing functions on the data comprises computing a data metric. In some embodiments, the data metric is calculated with respect to a start time and an end time. In 1004, report data is filtered according to the tenant granularity filter (e.g., the tenant granularity filter associated with the tenant requesting the report). In some embodiments, filtering report data according to the tenant granularity filter comprises determining data for the report according to the granularity permissions (e.g., removing report data associated with a data category or subcategory the tenant has indicated to opt-out from). In 1006, it is determined whether the report data can be linked to a tenant. In various embodiments, report data can be linked to a tenant in the event that it is identifiable as being associated with a single tenant, in the event that it is identifiable as being associated with a small number of tenants such that an inference of data can be made, in the event that it is identifiable as being associated with the report requesting tenant and a single other tenant, or report data can be linked to a tenant in any other appropriate way. For example, a processor unit (e.g., a secure data commingler) automatically determines whether report data can be linked back to a tenant or that the tenant can be inferred based on the report output. In some embodiments, the automatic determination is based on factors such as the report data source, functions and parameters associated with the determination of a benchmark analytic calculation. For example, if a user wishes to execute a report to determine the median salary of Female Software Engineers in the Bay Area working in technology companies, the processor will evaluate the report parameters and determine applicable contributed data to match the report request, then pass the results to a privacy function to determine whether enough contributors participated in the data set for an aggregation after which an individual tenant is not inferable (e.g., whether the number of contributors is greater than a threshold number of contributors). This means that the data is not able to be analyzed by the tenant requesting the report execution to determine the contributing tenants whose data is present in the data set identified by the report parameters. For another example, given prior knowledge that an outlier entity has opted in to sharing data, the system can analyze a query response or a report to determine whether, a viewer of the query response or reader of the report would be able isolate or infer data associated with the outlier entity assuming that certain knowledge is available regarding the outlier entity (e.g., it is known that 1000 small companies and a gigantic retailer are the only participants, and it is common knowledge that the gigantic retailer provides data to the system, then any 'max' value is pretty clearly going to be from the gigantic retailer, and shouldn't be returned by the system). In some cases, the multitenant database system uses its stored information regarding the outlier entity, or a stored set of publicly available set of data, to analyze the query response or report to determine whether any of the presented data represents only one entity's data or only a few entities' data such that the entity's data can be extracted or isolated. In the event it is determined that the report data can be linked to a tenant, control passes to 1008. In 1008, reporting is blocked (e.g., the report is not provided), and the process ends. In the event it is determined in 1006 that report data cannot be linked to a tenant, control passes to 1010. In 1010, the report comprising filtered report data is provided.

Figure 11:
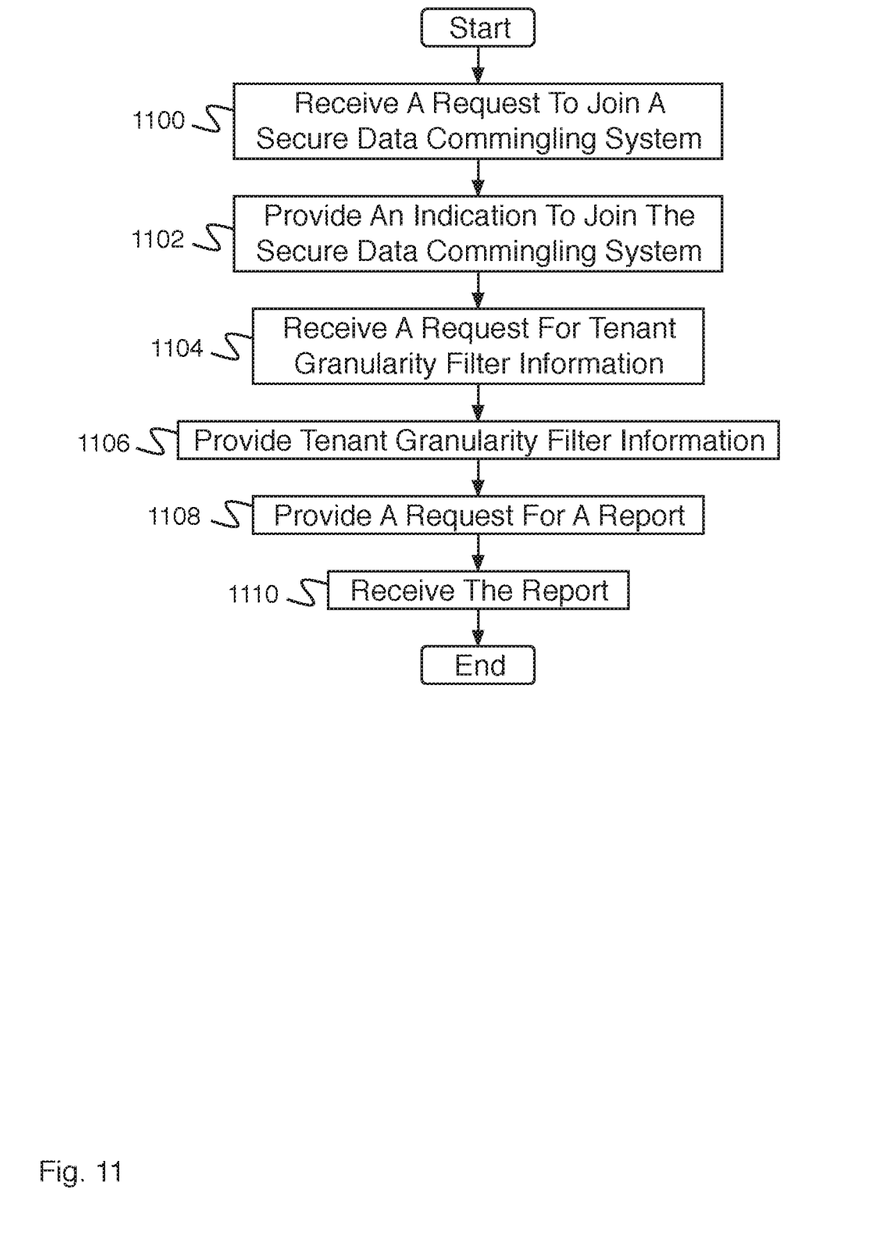
FIG. 11 is a flow diagram illustrating an embodiment of a process for interacting with a secure data commingling system.

FIG. 11 is a flow diagram illustrating an embodiment of a process for interacting with a secure data commingling system. In some embodiments, the process of FIG. 11 is executed by a tenant user using a tenant system (e.g., tenant system 108 of FIG. 1). In the example shown, in 1100, a request is received to join a secure data commingling system. In 1102, an indication is provided to join the secure data commingling system. In 1104, a request is received for tenant granularity filter information. In 1106, tenant granularity information is provided. For example, companies may not be allowed to share data about all workers or just certain populations of workers by statute; a work council may prohibit sharing of worker salary information—in such a case individual level information could not be sent to the commingled storage, but aggregate level information might be valid to share. Alternatively a workers council for a particular country might forbid sharing gender information about workers both at an individual and an aggregate level—in such cases these populations of workers would need to be excluded from a tenant's communication both to and from the commingled store entirely. In 1108, a request for a report is provided. In 1110, the report is received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for an analytic database, comprising:
 a plurality of tenant data storage units for storing tenant data isolated by tenant;
 a commingling storage unit, and
 a processor configured to:
  receive, from an input interface, an indication to build an analytic database;
  in response to a determination that a first tenant corresponding to a first tenant data storage unit of the plurality of tenant data storage units has indicated to opt-in to include a first portion of tenant data associated with the first tenant, transfer from the first tenant data storage unit to the commingling storage unit the first portion of the tenant data associated with the first tenant;
  build the analytic database using the first portion of the tenant data associated with the first tenant and data associated with one or more other tenants;
  update the analytic database based on one or more changes to an opt-in status associated with the first tenant, wherein a change to the opt-in status associated with the first tenant modifies the data associated with the first portion of the tenant data associated with first tenant included in the analytic database, wherein updating the analytic database comprises:
  deleting the analytic database; and
  rebuilding the analytic database based at least in part on the one or more changes to the opt-in status associated with the first tenant to obtain an updated analytic database.

2. The system of claim 1, wherein the processor is further configured to compute a data metric based at least in part on the analytic database.

3. The system of claim 2, wherein the data metric is calculated with respect to a start time and an end time.

4. The system of claim 1, wherein the data includes historical transaction data.

5. The system of claim 1, wherein the processor is further configured to:
 store granularity permissions associated with the first tenant indicating one or more instances of tenant indicated data not to be transferred;
 wherein the data to build the analytic database stored in the commingling storage unit is transferred without transferring the one or more instances of tenant indicated data indicated not to be transferred.

6. The system of claim 5, wherein the tenant indicated data comprises data categories.

7. The system of claim 6, wherein the tenant indicated data comprises data sub-categories.

8. The system of claim 6, wherein the data categories comprise location, time period, or organization unit level.

9. The system of claim 1, wherein the processor is further configured to receive a request for a report.

10. The system of claim 9, wherein the processor is further configured to determine report data for the report based at least in part on granularity permissions.

11. The system of claim 10, wherein determining the report data for the report based at least in part on granularity permissions comprises providing the report data according to tenant indicated data, data types, data categories, or data sub-categories.

12. The system of claim 1, wherein an indication to build the analytic database is triggered in response to key data being changed in the plurality of tenant data storage units.

13. The system of claim 1, wherein an indication to build the analytic database is triggered in response to new data being made available.

14. The system of claim 1, wherein an indication to build the analytic database is triggered in response to new data being made unavailable.

15. The system of claim 1, wherein an indication to build the analytic database is triggered in response to the first tenant providing an opt-in indication.

16. The system of claim 1, wherein an indication to build an analytic database is triggered in response to the first tenant providing an opt-out indication.

17. The system of claim 1, wherein the processor is further configured to determine that the tenant has indicated to opt-in to include the first portion of tenant data associated with the first tenant.

18. The system of claim 17, wherein determining that the first tenant has indicated to opt-in to include a first portion of tenant data associated with the first tenant comprises selecting the first tenant from a set of opt-in tenants.

19. A method for an analytic database, comprising:
receiving an indication to build an analytic database;
in response to determining that a first tenant corresponding to a first tenant data storage unit of a plurality of tenant data storage units for storing tenant data isolated by tenant has indicated to opt-in to include a first portion of tenant data associated with the first tenant, transferring from the tenant data storage unit to a commingling storage unit the first portion of the tenant data associated with the first tenant;
building the analytic database using the first portion of the tenant data associated with the first tenant and data associated with one or more other tenants; and
updating the analytic database based on one or more changes to an opt-in status associated with the first tenant, wherein a change to the opt-in status associated with the first tenant modifies the data associated with the first portion of the tenant data associated with first tenant included in the analytic database, wherein updating the analytic database comprises:
deleting the analytic database; and
rebuilding the analytic database based at least in part on the one or more changes to the opt-in status associated with the first tenant to obtain an updated analytic database.

20. A computer program product for an analytic database, the computer program product being embodied in a non-transitory computer readable storage medium and comprising computer instructions for:
receiving an indication to build an analytic database;
in response to determining that a first tenant corresponding to a first tenant data storage unit of a plurality of tenant data storage units for storing tenant data isolated by tenant has indicated to opt-in to include a first portion of tenant data associated with the first tenant, transferring from the tenant data storage unit to a commingling storage unit the first portion of the tenant data associated with the first tenant;
building the analytic database using the first portion of the tenant data associated with the first tenant and data associated with one or more other tenants; and
updating the analytic database based on one or more changes to an opt-in status associated with the first tenant, wherein a change to the opt-in status associated with the first tenant modifies the data associated with the first portion of the tenant data associated with first tenant included in the analytic database, wherein updating the analytic database comprises:
deleting the analytic database; and
rebuilding the analytic database based at least in part on the one or more changes to the opt-in status associated with the first tenant to obtain an updated analytic database.

* * * * *